United States Patent
Rabasa et al.

(10) Patent No.: US 11,644,133 B2
(45) Date of Patent: May 9, 2023

(54) POKA-YOKE V-CLAMP FOR EXHAUST SYSTEMS

(71) Applicant: Ford Global Technologies, LLC, Dearborn, MI (US)

(72) Inventors: Luis Rabasa, Naucalpan de Juarez (MX); Miguel Angel Carcamo, Mexico City (MX); Juan Pablo Salgado, Cd Lopez Mateos (MX)

(73) Assignee: Ford Global Technologies, LLC, Dearborn, MI (US)

( * ) Notice: Subject to any disclaimer, the term of this patent is extended or adjusted under 35 U.S.C. 154(b) by 224 days.

(21) Appl. No.: 17/126,410

(22) Filed: Dec. 18, 2020

(65) Prior Publication Data

US 2022/0196192 A1 Jun. 23, 2022

(51) Int. Cl.
*F16B 2/08* (2006.01)
*F16L 23/10* (2006.01)

(52) U.S. Cl.
CPC .............. *F16L 23/10* (2013.01); *F16B 2/08* (2013.01)

(58) Field of Classification Search
CPC ....... F16L 23/08; F16L 23/10; F01N 13/1811; F16B 2/08
See application file for complete search history.

(56) References Cited

U.S. PATENT DOCUMENTS

| | | | |
|---|---|---|---|
| 1,600,561 A * | 9/1926 | O'Connor | F16L 15/008 285/348 |
| 2,212,571 A * | 8/1940 | Martin | F16L 23/04 285/391 |
| 3,223,439 A * | 12/1965 | Stevens | F16L 25/065 285/373 |
| 5,188,397 A * | 2/1993 | Hynes | E21B 33/03 285/24 |
| 5,499,849 A * | 3/1996 | Fend | F16L 23/08 285/411 |
| 5,653,481 A * | 8/1997 | Alderman | F16B 31/04 411/533 |
| 9,677,473 B2 | 6/2017 | Dartnell | |
| 2005/0017510 A1 | 1/2005 | Rigollet et al. | |
| 2005/0264010 A1 | 12/2005 | Wagner | |
| 2006/0082155 A1* | 4/2006 | Hartig | F16L 23/08 285/408 |
| 2017/0292642 A1* | 10/2017 | Pendleton | F16L 23/04 |

FOREIGN PATENT DOCUMENTS

| | | | |
|---|---|---|---|
| CN | 105805799 A | 7/2016 | |
| WO | WO-2008033028 A1 * | 3/2008 | C23F 13/18 |
| WO | 2020037029 A1 | 2/2020 | |

* cited by examiner

*Primary Examiner* — Zachary T Dragicevich
*Assistant Examiner* — James A Linford
(74) *Attorney, Agent, or Firm* — Vincent Mastrogiacomo; Brooks Kushman P.C.

(57) ABSTRACT

An exhaust clamp may connect two exhaust components or conduits together in a leak tight manner while minimizing alignment issues during the assembly process. The clamp may include a split band having a clamping mechanism and a plurality of poka-yoke locking pins configured radially about the band. The poka-yoke locking mechanism may be configured to slidably engage a bead or ridge formed on the exhaust components to align the exhaust components during the assembly process an allow the operator to tighten the clamp about the exhaust components.

15 Claims, 4 Drawing Sheets

POKA-YOKE V-CLAMP FOR EXHAUST SYSTEMS

TECHNICAL FIELD

Band clamps are generally used to secure and connect a modular system of exhaust components such as tubing, mufflers, catalytic convertors, turbos, manifolds or headers together to create a unitary exhaust system attached to a motor vehicle. The modular system, when connected, creates an airtight fluid path to move exhaust gases from the engine to the environment at a tailpipe away from the vehicle.

BACKGROUND

The present disclosure relates generally to tubing clamp designs and, more specifically, to exhaust tubing clamp designs. These clamps typically include a set of flanges called "bicone tabs," which were originally conceived to be bent inwards and two sections of exhaust conduit connected to provide mechanical retention. However, these tabs may not provide a level of stiffness required to hold the conduit together and allow one side to sag during assembly. Additionally, the tabs were intended to provide a visual indication that the connection is complete.

Unfortunately, the tabs provide a false positive as operators have different perceptions of how much the tabs bend during installation, which may result in improper assembly and ultimately reworking of the exhaust clamp to achieve alignment and an airtight exhaust system.

SUMMARY

An exhaust V-clamp having an integrated poka-yoke locking system to lock the hot end and cold end of the exhaust system together is disclosed. The poka-yoke mechanism of "locks" may include a plurality of separate locks divided into multiple components, such as, but not limited to a cap connected to a shaft, a spring configured about the shaft and sloped or ramped shape locking end. The ramp and the cap may be removable to allow for the assembly and insertion of the shaft and the spring extending through a plurality of bore holes or apertures configured through an outer surface of a V-shaped clamp perimeter. The cap, sloped end and shaft may be removable to allow for installation of the exemplary clamp at supplier site through the bore or further on an exhaust component.

The shaft may have the spring as an integrated part in order to have it positioned between the longer diameter at the bottom of the shaft adjacent the sloped/ramped end and the V-clamp body. The spring may control the compression and extension of the locking feature through the V-clamp body of the exemplary exhaust clamp. Also, a visual aid may be included on the shaft to give the operator a positive element for proper installation.

More specifically, by way of example an exhaust clamp having a circular band clamp, which extends around a central axis is disclosed herein. The band clamp may include an outer clamp surface, an inner surface facing the central axis, and at least one aperture extending through the outer and inner surfaces. The circular band clamp may be configured to engage at least one exhaust component, additionally, a locking pin slidably engaged with and extending through the at least one aperture may also be included.

The exhaust clamp may further include a plurality of apertures configured radially around the circular band clamp and each aperture extending through the outer and inner surfaces, and a plurality of corresponding locking pins may be configured in the plurality of at least one apertures, such that a single locking pin is configured in a single aperture.

The exhaust clamp locking pin may include a shall, a head and a chamfer. The head may be fixed and/or removably configured on a first end of the shaft and the chamfer may also be fixed and/or removably configured on a second end of the shaft, the chamfer may engage a portion of the at least one exhaust component.

The exhaust clamp cap may include a grab surface that provides the retainment of the locking pin while also allowing a user to extend the locking pin radially outward from the shaft. The grab surface may extend a distance past the shaft that is greater than the shaft diameter and the at least one aperture.

The exhaust clamp chamfer may be an angled or sloped ramp provided on a surface of the chamfer surface may be configured to slide past a ridge configured on an outer surface of the at least one exhaust component.

The exhaust clamp locking pin may include a spring extending around the shaft and the spring may be configured to exert a longitudinal force on the locking pin to push the engagement head into the at least one exhaust component when the exhaust component is in an assemble configuration.

The circular exhaust clamp may include a cross-section having a V-shape inner and outer surfaces the clamp may also include a split configured to separate the circular band to position the band around at least one exhaust component.

The exhaust clamp may also include a clamping mechanism that may be configured to secure and connect a first exhaust component and a second exhaust component together creating a unitary exhaust assembly.

Another exemplary representation of an exhaust clamp may include a split circular band clamp extending around a central axis, the band clamp may include an outer surface, an inner engagement surface, at least one aperture configured radially about the central axis and extending through the outer and inner surfaces, and a locking pin slidably extending through the at least one aperture, the locking pin may be configured to engage at least one exhaust component.

The exhaust system clamp split band may include a clamping mechanism that may be configured to secure the band clamp to at least one exhaust component. The split band may be v-shaped that may be configured to open and close radially when the clamping mechanism is one of tightened or loosened.

The exhaust system clamp locking pin may include a shaft, a cap configured on a first end of the shaft and an engagement head configured on a second end of the shaft. It is contemplated that the cap may include a grab surface that extends radially outward from the shaft at a distance that is greater than the shaft diameter this greater diameter may aid in the retention of the shaft in the aperture while also providing a surface for an operator to manipulate the locking pin.

The exhaust system clamp engagement head may be angled to provide a sloped or ramped surface, the surface may be configured to slide past a ridge or bead configured on an outer surface of the at least one exhaust component. Additionally, the locking pin may include a spring, the spring extends around the shaft and is configured to exert a longitudinal force on the locking pin to push the engagement head into the at least one exhaust component adjacent a circumferential bead and a ridge configured on the at least one exhaust component outer surface and a component inner surface.

An exemplar exhaust assembly is disclosed, the exhaust assembly may have a first exhaust conduit and a second exhaust conduit, the first conduit and second conduit may be configured to engage one another. The exhaust assembly may also include a band clamp, the band clamp may be configured to extend around and may fixedly connect the first conduit and the second conduit together where the band clamp is preassembled to the first conduit prior to engagement with the second conduit. Additionally, the exemplar exhaust assembly may further include a locking pin slidably extending through at least one hole configured through an outer surface of the band clamp. The locking pin may be configured to slide longitudinally away from a center line of the band clamp when the first exhaust conduit and the second exhaust conduit during engagement moreover, the locking pin may also include a spring to force, the spring may be configured to force the pin into at least one of the first exhaust conduit and the second exhaust conduit to align and lock the two conduits in place while by moved radially outward while engaging a first surface of a bead and further moved radially inward when moving past a ridge of the bead.

The exhaust assembly may further include a clamping mechanism. The clamping mechanism may transfer between a first position and a second position, wherein when the first position having a first arcuate formation of the band clamp and the second position having a second arcuate formation of the band clamp, the second formation including a diameter that is less than a diameter of the first arcuate formation.

The exhaust system clamp locking pin may further include a visual indicator, the visual indicator may be visible when the locking pin slides longitudinally away from the center line of the band clamp and may be visible when the locking pin slides longitudinally toward the center line of the band clamp, the visual indicator may be configured to indicate when the first exhaust conduit and the second exhaust conduit are aligned and reading for an operator to tighten the clamping mechanism.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
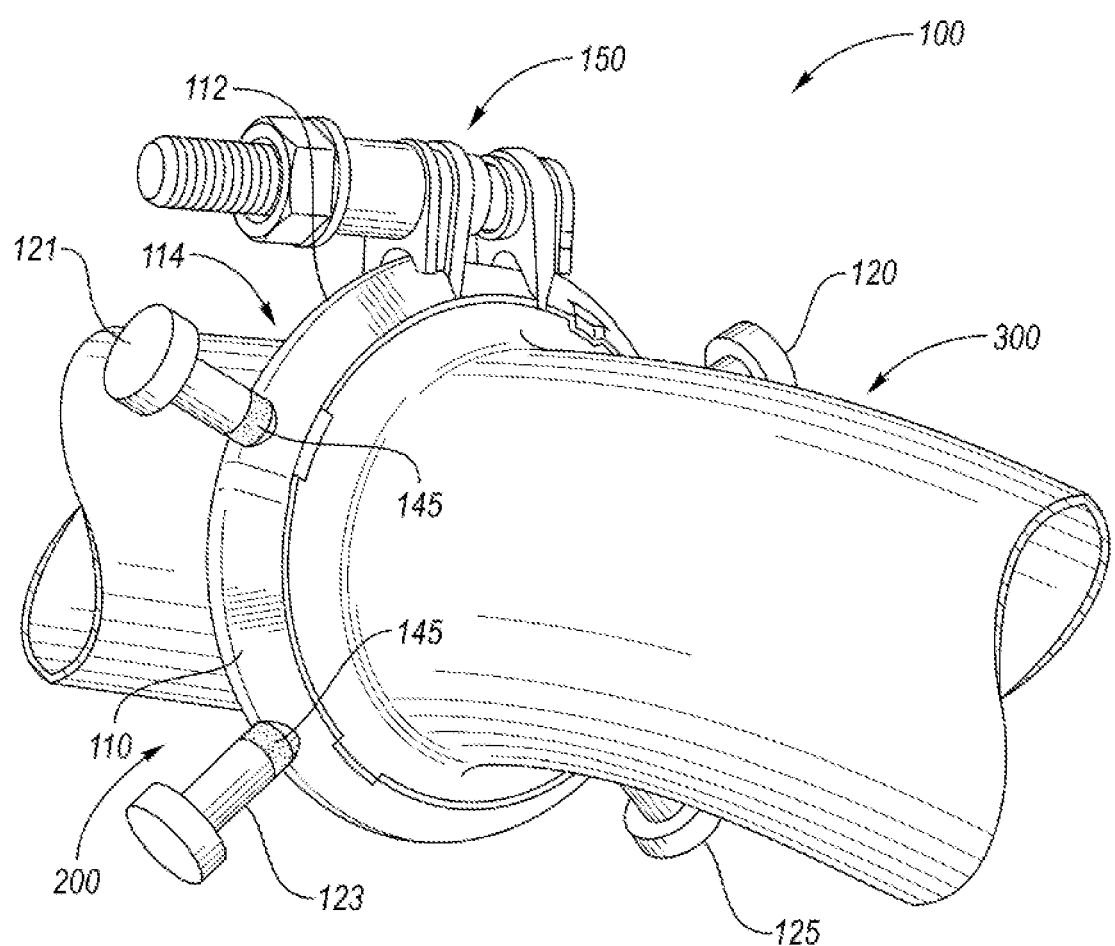
FIG. 1 is a perspective view of an embodiment of an exhaust assembly including an exhaust band clamp securing two exhaust components.

Referring to FIG. 1, an exhaust assembly 100 including an exhaust band clamp 110 positioned around a first exhaust component 200 and a second exhaust component 300 is shown. In the illustrative embodiment, the exhaust assembly 100 is configured as a connection in an automotive exhaust system. However, is contemplated that the exhaust assembly 100 embodiment illustrated in FIG. 1 may also be configured for use in other applications, such as, but not limited to automotive, industrial or commercial applications where a joint may be connected. As further illustrated in FIG. 1, the exhaust band clamp 110 may include a clamping mechanism 150 and at least one alignment locking mechanism 120 or, as illustrated, a plurality of alignment locking mechanisms 120, 121, 123, 125.

As described in greater detail below, the exhaust band clamp 110 may be secured to the first exhaust component 200 prior to connecting the second exhaust component 300. Once the second exhaust component 300 is connected, the clamping mechanism 150 may be tightened to join the two exhaust components 200, 300 together to limit or prevent longitudinal separation in the direction of an exhaust band clamp centerline 102 (see FIG. 2). This poka-yoke design may provide the assembly 100 with proper alignment while allowing for the elimination of an alignment tool (not illustrated) used by an operator during an assembly process. Proper alignment may be indicated thorough the use of a visual aid or indicator 145, which will be discussed in greater detail below.

Additionally, the exhaust band clamp 110 may include the central axis or centerline 111 that may be substantially co-linear with an axis (not illustrated) of the first exhaust component 200 and an axis (not illustrated) of the second exhaust component 300 when assembled as the exhaust assembly 100. The exhaust band clamp 110 may include a front 112 and a rear 114, both the front and the rear may be configured to receive either the first exhaust component 200 or second exhaust component 300. For illustrative purposes, FIG. 1 shows the exemplary assembly 100 where the first exhaust component 200 is connected to the clamp rear 114 and the second exhaust component 300 is connected to the clamp front 112.

Figure 2:
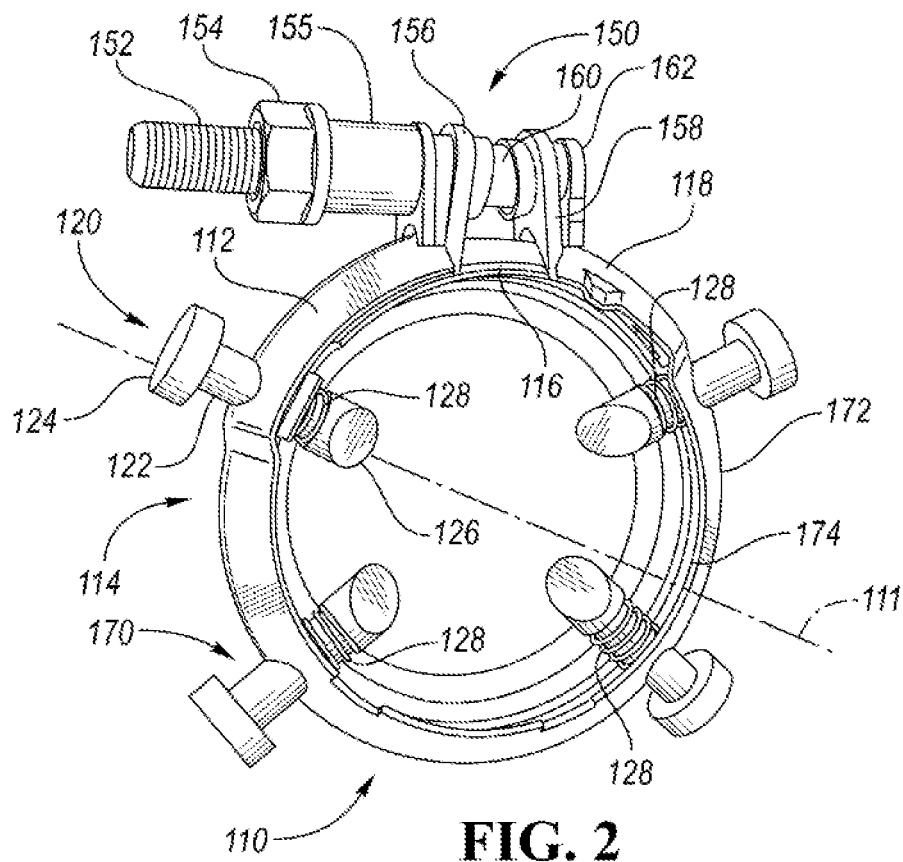
FIG. 2 is an elevation view of the exhaust band clamp.

Referring now to FIG. 2, the exemplary exhaust band clamp 110 is illustrated. The clamp 110 is illustrated as a cylindrical v-shaped band that extends radially around the centerline 111. However, it is contemplated that other cylindrical clamping shapes may be used, such as, but not limited to a flat, boxed. "c" or other geometric shape as commonly known in the art of clamps. Additionally, the clamp front 112 and the clamp rear 114 may be substantially symmetrical in shape to provide an even gripping engagement with the first and second exhaust components 200, 300. Additionally, the exemplary clamp 110 may include a first band end 116 and a second band end 118, the first band end 116 connected to a first clamping guide 156 of the clamping mechanism 150 where the second band end may be connected to a second clamping guide 158 of the clamping mechanism 150. The clamping guides 156, 158 may be configured to receive a fastener 152 having a support end 162 connected to a fastener shaft 160. As illustrated, the fastener 152 may be a threaded rod or bolt configured to engage a nut 154 positioned adjacent a spacer 155 and when the nut 154 is rotated the clamping mechanism 150 tightens to secure the exhaust clamp 110 to the exhaust components 200, 300. It should be appreciated that clamping mechanism 150 as illustrated is merely exemplary and other known clamping mechanisms may be used such as a toggle or other known exhaust clamping mechanism.

As shown in FIG. 2 and previously discussed above, the exhaust band clamp 110 may include a plurality of alignment locking mechanisms 120, 121, 123, 125 and for ease of disclosure the alignment locking mechanisms 120, 121, 123, 125 may discussed interchangeably as a locking pin 120. As illustrated in FIG. 2, the exemplary locking pin 120 may be divided into separate components, a cap 124, a shaft 122, a spring 128 and a locking end 126. The cap 124 and the locking end 126 may be either fixed or removably connected to the shaft 122, such that at least one of the cap 124 and the locking end 126 may be removed from the shaft 122 to allow for positioning the spring 128 onto the shaft 122 prior to inserting the locking pin 120 through an aperture 170 (see FIG. 3) configured in an outer clamp surface 172, extending through an inner clamp surface 174 and projecting toward the centerline 111

Figure 3:
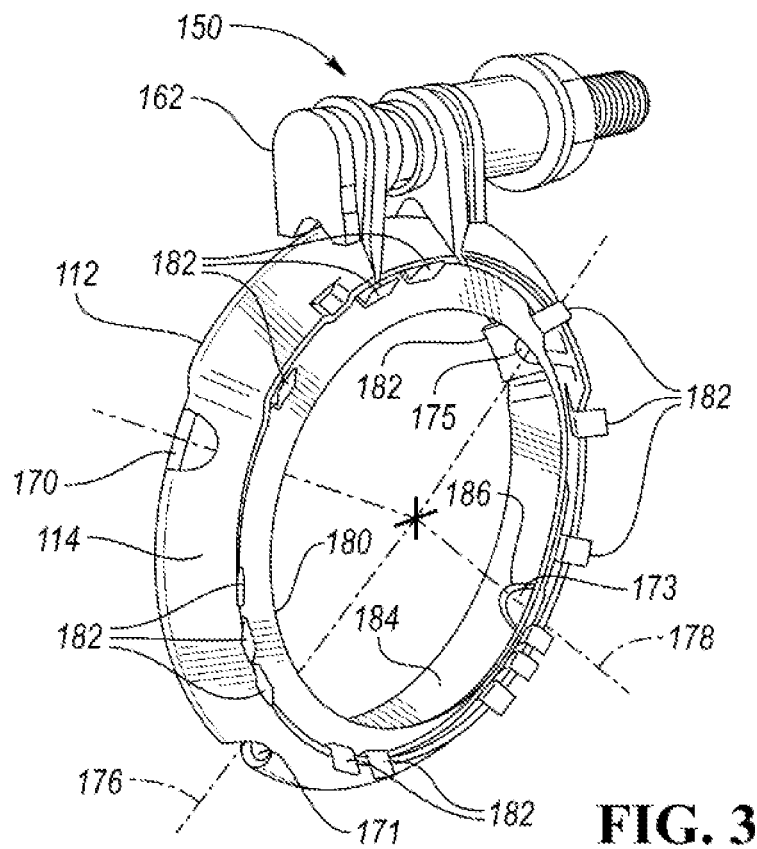
FIG. 3 is a perspective view of the exhaust band clamp.

Referring now to FIG. 3, the exemplary exhaust band clamp 110 is illustrated including a plurality of apertures 170, 171, 173, 175, configured radially about outer clamp surface 172 of the exhaust band clamp 110. Hereinafter, and for ease of disclosure the plurality of apertures 170, 171, 173, 175 may discussed interchangeably as the aperture 170. Each aperture 170 may be configured to receive a corresponding locking pin 120, each locking pin 120 may be configured to slide substantially longitudinally and substantially co-linear along an aperture centerline 176 each aperture 170 may include its own centerline or as illustrated in FIG. 3 along the same plane as a corresponding and opposite aperture 170. The exemplary exhaust band clamp illustrates the two aperture centerlines 176, 178 that intersect and the exhaust clamp centerline 111 and project radially out through each aperture 170, 171, 173, 175.

Figure 4:
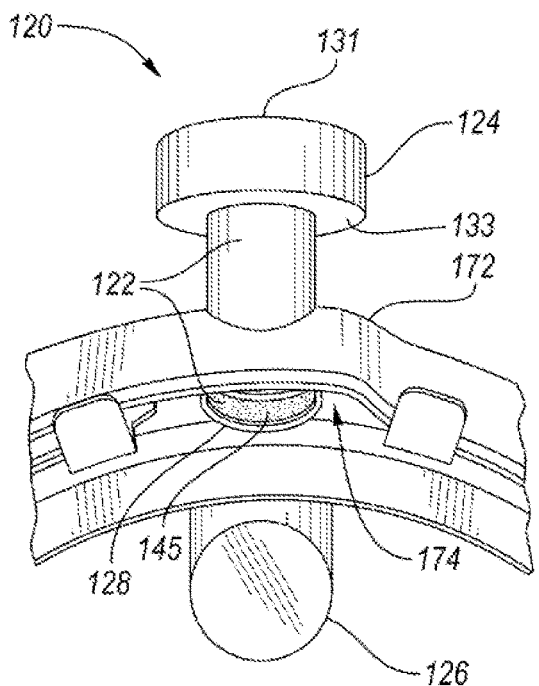
FIG. 4 is an elevation view of an exhaust engagement pin configured in the exhaust band clamp.

As illustrated in FIG. 3, the exemplary exhaust band clamp 110 may include a mounting sleeve 180 extending circumferentially around the inner clamp surface 174. The mounting sleeve 180 may include a plurality of tabs 182 extending from the mounting sleeve 180 and protruding externally toward the first exhaust component 200. The sleeve 180 and the tabs 182 may provide an additional engagement surface 184 for contacting and retaining the exhaust band clamp 110 to the first exhaust component 200 prior to assembly of and engagement with the second exhaust component 300. Additionally, the mounting sleeve 180 may also include an aperture 186 configured to receive the locking pins 120 in a slidable position as discussed above and illustrated at least in FIGS. 3 and 4.

Referring now to FIGS. 4 thru 7, an exemplary locking pin 120 is illustrated, the locking pin 120 may be inserted into and extending through the aperture 170 and the mounting sleeve 180. More specifically, the illustrations show the interconnection between the cap 124 positioned radially outward from the outer clamp surface 172 and including a top surface 131, a cylindrical side wall 133 and a bottom shoulder 134. Additionally, the shaft 122 may be slidably extending through the aperture 170 with the spring 128 positioned around the shall 122 and abutting the inner surface 174 at a first spring end 127 and abutting a locking end shoulder 129 at a second spring end 130. The spring 128 may provide a longitudinal force pushing the locking pin 120 radially inward towards the exhaust clamp centerline 111. The cap 124 may be considered as a handle or grip surface allowing an operator to overcome a spring force of the spring 128 to manually pull the locking pin 120 laterally away from the exhaust clamp 120 centerline 111. Movement of the locking pin 120 may occur when the exhaust components 200, 300 are joined.

Retention of the exemplary locking pin 120 within the aperture 170 may be achieved by having a shaft diameter 138 that is less than the diameter of the cap 124 configured at outer end of the shaft 122 and a shaft diameter 138 that is less than the diameter of the locking end 126. The diameter of the locking end 126 and the cap 124 may be the same provided they both have a cross-sectional diameter that is greater than the cross-sectional diameter of the shaft 122 and the diameter of the aperture 174. Additionally, other retention devices may be used to retain the locking pin 120 within the aperture 170, such as, but not limited to a clip ring, cotter pin threaded nut or other type of known fastener used to retain a pin between two surfaces 172, 174.

Figure 5:
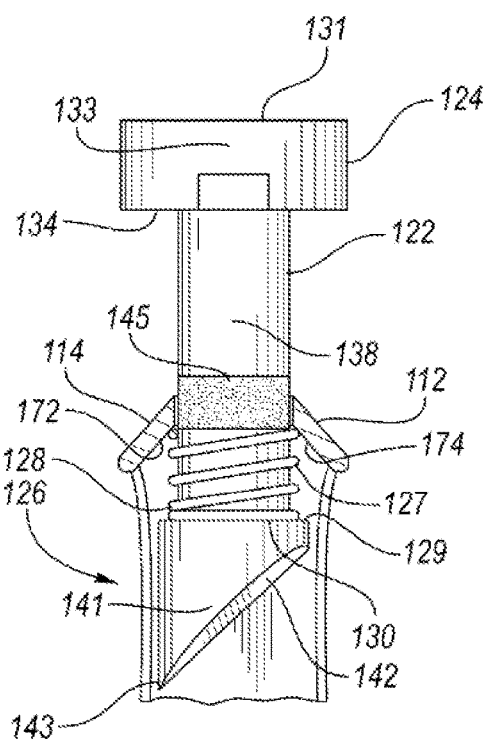
FIG. 5 is an elevation view of the exhaust engagement pin configured in a section of the exhaust band clamp.
Figure 6:
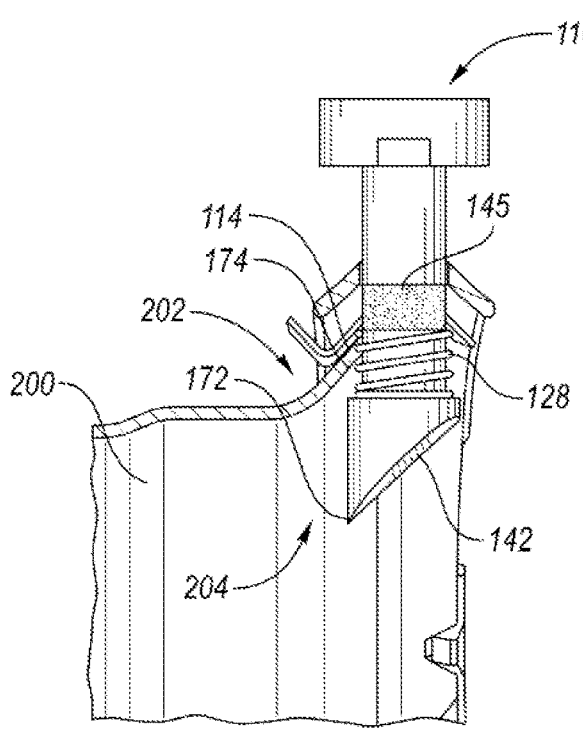
FIG. 6 is a partial cross-sectional view of an exhaust assembly including the exhaust band clamp secured to a first exhaust component.
Figure 6:
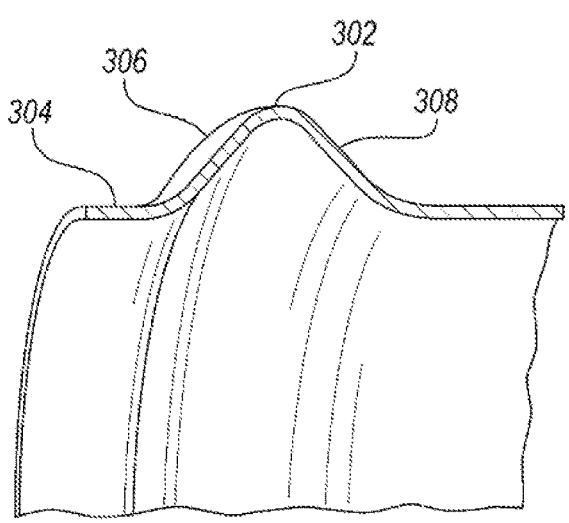

As illustrated, the exemplary locking end 126 is a sliced cylinder 141 having a slope 142 extending longitudinally away from the shaft 122 and terminates into a locking point 143. It should be appreciated that other geometric shapes may be used for the locking end 126, such as, but not limited to a conical or frustoconical shape, a chamfered end or other known shape configured to align and hold the assembly 100 together prior to and during tightening of the clamp mechanism 150 as discussed or known in the art. FIGS. 5 and 6, further illustrate the use of an exemplary visual aid 145 configured about the circumference on the outer surface of the shaft 122. The visual aid 145 may be configured as a groove, painted or etched section or other known marking element. The visual aid 145 may provide the operator with a visual indication of proper assembly when the first and second exhaust components 200, 300 are connected.

FIG. 6 further illustrates a partial cross-section of the exemplary exhaust assembly 100 with the exhaust band clamp 110 positioned around and on a frustoconical surface 202 configured on a female end 204 of the first exhaust component 200, the first exhaust component 200 being the "Hot" side of the exhaust assembly 100. The exhaust band clamp 110 demonstrating the spring 128 in a relaxed or extended position prior to insertion of the second exhaust component 300, the second exhaust component being the "Cold" side of the exhaust assembly 100. As illustrated, the second exhaust component 300 includes a bead or v-shaped ridge 302 formed in a portion of a first end 304 to create a robust joint for sealing in exhaust gases when clamping mechanism 150 is fastened. It is contemplated that the female end 204 and the male end 304 may be configured as interchangeably on either the "Hot" and "Cold" sides of the exhaust assembly 100 and the exemplary illustrations by no means limits other exhaust connection configurations.

Figure 7:
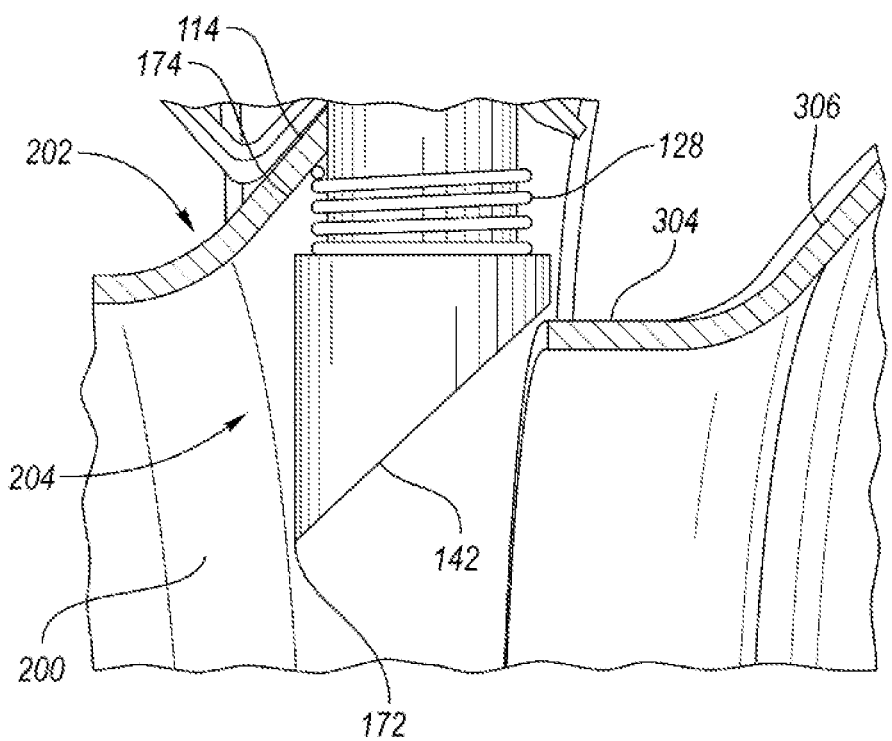
FIG. 7 is a partial cross-sectional view of the exhaust assembly during engagement of a second exhaust component.
Figure 8:
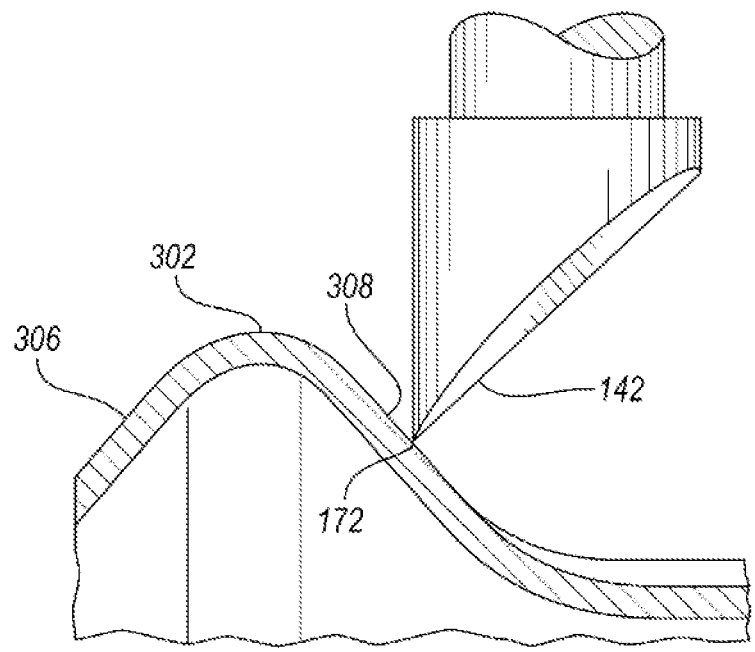
FIG. 8 is a perspective view of the exhaust engagement pin at an engagement position.

With further reference to FIGS. 6, 7 and 8, the frustoconical surface 202 may be configured to nest with the inner surface 174 of the rear side 114 of the exemplary exhaust band clamp 110 while the first end 304 is configured to slide into the first exhaust component and nesting a front surface 306 of the bead 302 against an inner surface 206 of the frustoconical surface 202 this connection may be achieved by overcoming the spring force of the spring 128 while the bead 302 is engaging and displacing the slope 142 to push the shaft 122 radially out of the aperture 170 thereby exposing the visual aid 145. Additionally, the clamp mechanism will need to be loose enough to create a space for the locking end 136 to extend radially outward and clear the bead 302. This clearance will allow the operator to continue pushing the second exhaust component 300 until the locking point 143 crests the top of the bead 302 and engages a back side 308 of the bead 302 and the front portion 306 of the bead is adjacent the frustoconical surface 202. Once the second exhaust component 300 is fully engaged with the first exhaust component 200 and the exhaust clamp 110, the visual aid 145 will indicate to the operator that the assembly 100 is aligned. The operator will then proceed with tightening or tensioning the clamping mechanism to secure the exhaust assembly 100 to create a substantially fluid tight exhaust system.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An exhaust clamp comprising:
   a circular band clamp extending around a central axis, the band clamp including an outer clamp surface, an inner surface facing the central axis, and at least one aperture extending through the outer and inner surfaces, the circular band clamp configured to engage at least one exhaust component; and
   a locking pin slidably engaged with and extending through the at least one aperture, wherein the locking pin includes a shaft, a head, and a chamfer, wherein the head is at least one of fixed and removably configured on a first end of the shaft and the chamfer is at least one of fixed and removably configured on a second end of the shaft, the chamfer configured to engage a portion of the at least one exhaust component, wherein the chamfer is angled to provide a surface, the surface is configured to slide past a ridge configured on an outer surface of the at least one exhaust component, and wherein the locking pin includes a spring, the spring extends around the shaft and is configured to exert a longitudinal force on the locking pin to push the head into the at least one exhaust component.

2. The exhaust clamp of claim 1, further comprising a plurality of the at least one aperture configured radially around the circular band clamp and each aperture extending through the outer and inner surfaces, and a plurality of corresponding locking pins configured in the plurality of at least one aperture, wherein a single locking pin is configured in a single aperture.

3. The exhaust clamp of claim 1, wherein the cap includes a grab surface that extends radially outward from the shaft at a distance that is greater than the shaft diameter and the at least one aperture.

4. The exhaust clamp of claim 1, wherein the circular band clamp inner and outer surfaces include a v-shaped cross-section.

5. The exhaust clamp of claim 1, wherein the circular band clamp includes a split, the split configured to separate the circular band to position the circular band around at least one exhaust component.

6. The exhaust clamp of claim 5, further comprising a clamping mechanism, the clamping mechanism is configured to at least one of secure and connect the circular band clamp to a first exhaust component and a second exhaust component.

7. An exhaust clamp comprising:
   a split circular band clamp extending around a central axis, the band clamp including an outer surface, an inner engagement surface, and at least one aperture configured radially about the central axis and extending through the outer and inner surfaces; and
   a locking pin slidably extending through the at least one aperture, the locking pin configured to engage at least one exhaust component, wherein the locking pin includes a shaft, a cap configured on a first end of the shaft, and an engagement head configured on a second end of the shaft and wherein the locking pin includes a spring, the spring extends around the shaft and is configured to exert a longitudinal force on the locking pin to push the engagement head into the at least one exhaust component.

8. The exhaust system clamp of claim 7, wherein the split band further includes a clamping mechanism, the clamping mechanism is configured to secure the band clamp to at least one exhaust component.

9. The exhaust system clamp of claim 8, wherein the split band is v-shaped and is configured to open and close radially when the clamping mechanism is one of tightened or loosened.

10. The exhaust system clamp of claim 7, wherein the cap includes a grab surface that extends radially outward from the shaft at a distance that is greater than the shaft diameter.

11. The exhaust system clamp of claim 7, wherein the engagement head is angled to provide a surface, the surface is configured to slide past a ridge configured on an outer surface of the at least one exhaust component.

12. The exhaust clamp of claim 7, wherein the at least on exhaust component includes at least one of a bead and a ridge configured on at least one of a component outer surface and a component inner surface.

13. An exhaust assembly comprising:
   a first exhaust conduit;
   a second exhaust conduit, the first conduit and second conduit are configured to engage one another;
   a band clamp configured to extend around and fixedly connect the first conduit and the second conduit together where the band clamp is preassembled to the first conduit prior to engagement with the second conduit; and
   a locking pin slidably extending through at least one aperture configured through an outer surface of the band clamp, the locking pin configured to slide longitudinally away from a center line of the band clamp when at least one of the first exhaust conduit and the second exhaust conduit are joined during engagement; and wherein the locking pin further includes a spring, the spring is configured to force the pin against at least one of the first exhaust conduit and the second exhaust conduit to align and lock the two conduits in place.

14. The exhaust assembly of claim 13, further comprising a clamping mechanism, the clamping mechanism configured to transfer between a first position and a second position, wherein the first position has a first arcuate formation of the band clamp and the second position has a second arcuate formation of the band clamp, the second formation includes a diameter that is less than a diameter of the first arcuate formation.

15. The exhaust system clamp of claim 13, wherein the locking pin further includes a visual indicator, the visual indicator is at least one of visible when the locking pin slides longitudinally away from the center line of the band clamp and visible when the locking pin slides longitudinally toward the center line of the band clamp, the visual indicator is configured to indicate when the first exhaust conduit and the second exhaust conduit are aligned.

* * * * *